S. F. VOSE.
SCRAPER.
APPLICATION FILED NOV. 2, 1909.
967,088.
Patented Aug. 9, 1910.
2 SHEETS—SHEET 2.
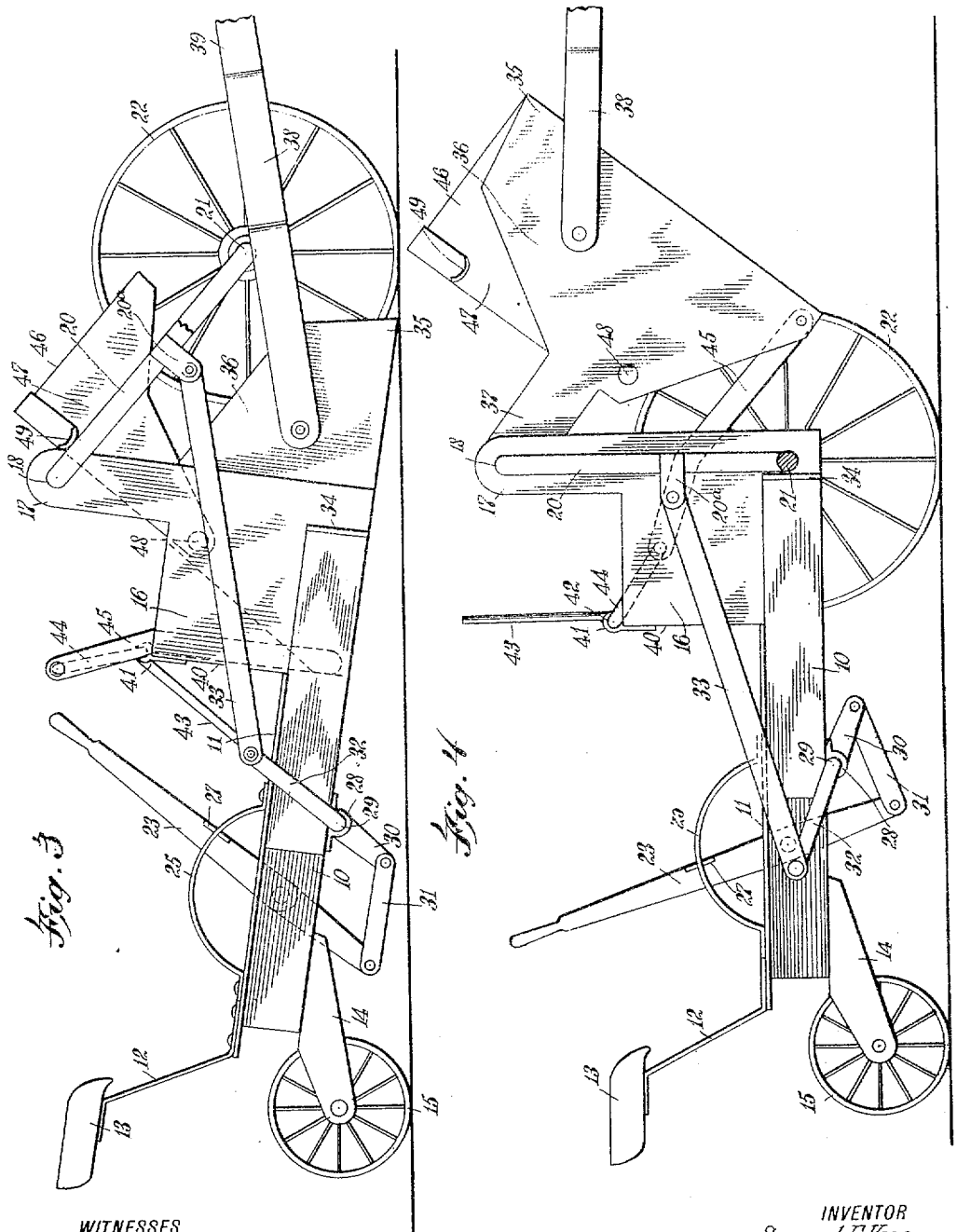
WITNESSES
INVENTOR
Samuel F. Vose
BY Munn & Co
ATTORNEYS

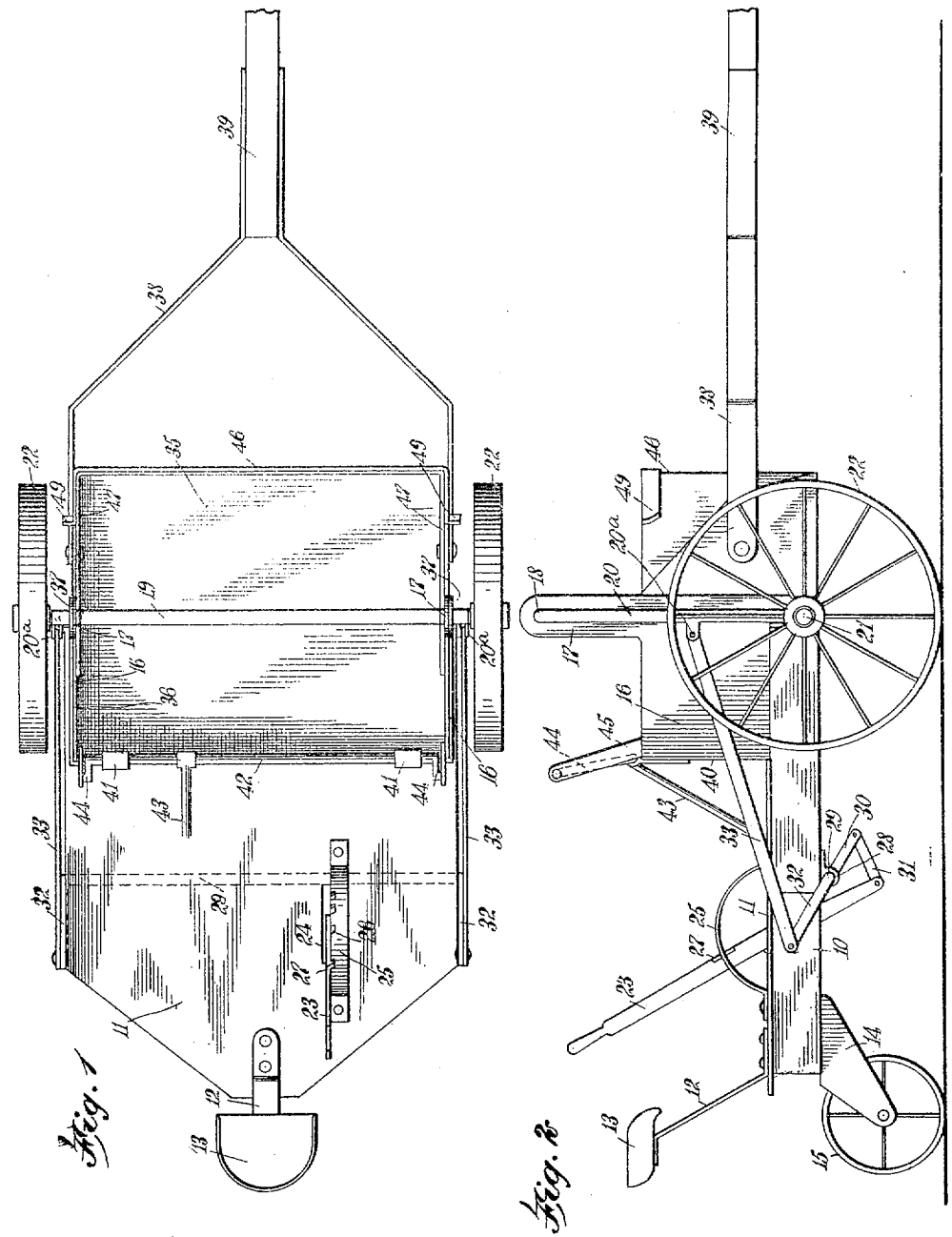

UNITED STATES PATENT OFFICE.

SAMUEL F. VOSE, OF SHAWNEE, OKLAHOMA.

SCRAPER.

967,088. Specification of Letters Patent. Patented Aug. 9, 1910.

Application filed November 2, 1909. Serial No. 525,848.

*To all whom it may concern:*

Be it known that I, SAMUEL F. VOSE, a citizen of the United States, and a resident of Shawnee, in the county of Pottawatomie and State of Oklahoma, have invented a new and Improved Scraper, of which the following is a full, clear, and exact description.

This invention relates to scrapers used in making excavations, earth fills and the like, and relates more particularly to a device of this class comprising a movable frame, a scoop mounted upon the frame and adapted for use in removing earth or other material, and means for rendering the scoop operative and inoperative, whereby when it is filled with material it can be easily moved from place to place, so that the material can be dumped where desired.

The object of the invention is to provide a simple, strong and efficient scraper, by means of which earth or other material can be rapidly and expeditiously removed from one place and dumped at another in forming excavations, in making earth fills, or in like operations, which requires comparatively little power to operate it, which can be operated by a single person, with little difficulty, which can be easily guided from place to place, and in which the scoop can be used not only to loosen the material but also as a carrier to transport the material from one point to another, the scoop being operable so that the material can be dumped at any desired place.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a plan view of an embodiment of my invention; Fig. 2 is a side elevation of the scraper showing the parts in position for transporting material; Fig. 3 is a similar view showing the scraper in position for removing the earth; and Fig. 4 is a similar view showing the scoop in position to dump material carried thereby.

Before proceeding to a more detailed explanation of my invention, it should be clearly understood that while I have shown for example, the scraper adapted to be drawn by horses or other draft animals, it can be propelled in any other convenient manner, for example by means of a traction engine. I provide a wheeled frame which can be partly raised or lowered, to render the scoop inoperative or operative, as will appear more clearly hereinafter, so that when the scoop is loaded with material and it is desired to transport the same from one place to another, the load is carried on the supporting wheels, and consequently, the power necessary to advance the material is considerably diminished. I also make use of the power of the draft animals or other traction means, for raising the scoop after it is filled with material, and in this way decrease the labor of the operator of the scraper.

Certain of the details of construction, needless to say, form no part of my invention and can be varied in accordance with individual preference and special conditions, without departing from the underlying spirit of the invention.

Referring more particularly to the drawings, I provide a frame 10 substantially of U-form and having the rear or closed end tapered. A platform 11 is mounted upon the frame, at the back, and has a spring upright 12 upon which is mounted a seat 13 for the operator of the scraper. A bracket 14 is pivotally mounted at the under side of the rear end of the platform and has a rear supporting wheel 15. At the forward ends of the frame sides are rigidly carried walls or sides 16 having upward extensions 17 provided with bearing openings 18 in which is journaled an axle shaft 19. The ends 20 of the shaft 19 are downwardly disposed at the outside of the side walls 16 and terminate in laterally disposed axle spindles 21 which carry the main supporting wheels 22. The wheels 15 and 22 may be of any suitable form adapted for the purpose and are preferably provided with wide rims to facilitate the use of the scraper on comparatively soft ground.

A hand lever 23 having a grip by means of which it can be easily manipulated, is pivoted underneath the platform 11 and extends movably through a slot 24 of the platform. It has associated therewith a notched, curved member 25 mounted upon the platform and provided with a plurality of notches 26 adapted to catch removably, a laterally disposed projection 27 of the lever, so that the latter can be locked in any one of a plurality of positions. The lever is located conveniently near the operator's seat so that he can manipulate it from this point.

The frame sides have bearings 28 located at the under side and having journaled therein a shaft 29. An arm 30 rigid with the shaft is connected with the lower end of the hand lever 23 by means of a suitable link 31. The shaft 29 has crank arms 32 joined by means of pivoted connecting rods 33 with arms or extensions 20ª of the downwardly disposed ends 20 of the axle shaft 19, so that the main supporting wheels can be pivotally operated in forward and backward directions by means of the hand lever 23. The frame sides have stops 34 adapted to be engaged by the lower ends of the parts 20 to limit the backward movement of these parts.

A scoop 35 having sides 36 provided with upward extensions 37 constituting hangers, is pivotally mounted by means of bearing openings of the hangers upon the axle shaft 19, between the sides 16. The scoop has the opposite longitudinal edges unobstructed, and has secured to the sides a yoke 38 provided with a draft tongue 39 or other device for attaching draft animals or other means for propelling the scraper.

The sides 16 are connected by a back 40 which has at the upper edge bearings 41 in which is journaled a shaft 42. The latter has a rigid, manipulating arm 43, and at the extremities has cranks 44 connected by means of the bent links 45 with the sides of the scoop at the lower, rear corners of the same. By suitably moving the arm 43, the scoop can be swung backward and forward as is shown most clearly in Figs. 3 and 4. By positioning the parts so that the manipulating arm 43 is downwardly disposed against the platform, as is shown most clearly in Fig. 2, the scoop is locked in position with its rear edge against the back, and it cannot be displaced in a forward direction by the pull of the draft means upon the yoke. This is due to the fact that the links 45 are somewhat bent, so that a forward pull upon the scoop tends to cause a downward pull at the upper end of the links 45 which are then located rearwardly of the shaft 42.

A shield or guard 46 is located at the front of the scoop, and has sides 47 positioned between the sides of the scoop and pivotally connected therewith by means of suitable pivot pins or rivets 48. The shield at the sides has stops 49 adapted to be engaged by the downwardly disposed ends 20 of the axle shaft, for a purpose which will appear more clearly hereinafter.

The operation of the scraper is as follows: To position the scraper operatively, so that it can be employed in loosening and removing earth and like material, the lever 23 is thrown forward by the operator so that the main supporting wheels are swung forward, the sides 20 of the axle shaft being positioned as is shown in Fig. 3. In this way, the forward edge of the scoop is brought to bear against the ground and the shield is displaced owing to the engagement of the sides 20 of the axle shaft with the stops 49 of the shield. These stops are arranged so that they can easily ride upward upon the ends 20 of the axle. The lever arm 43 at this time is of course so positioned that the scoop is locked against the back 40. The upward pull of the draft means advances the scraper and at the same time forces the forward cutting edge of the scoop through the earth so that the material passes up on to the scoop. When the scoop is filled, or when a sufficient quantity of material has advanced to a position thereupon, the operator moves the hand lever 23 backward, releasing it from the forward notch 26 by a lateral movement, which the normal resiliency of the lever permits. This backward movement of the lever 23 tends to move the axle parts 20 backward, and the pull of the draft means is utilized to return the scoop to its raised position, for the backward movement of the lever 23 tends to stop the forward movement of the main supporting wheels, and as the draft pull continues, the frame is moved upward and the parts 20 of the axle return to positions against the stops 34. At the same time, the shield swings downward gravitationally, the stops 49 slide along the axle parts 20, and the device then assumes the position shown in Fig. 2. It will be understood that the entire weight is now carried upon the supporting wheels, and comparatively little power is necessary to propel the loaded device. This is a decided advantage over ordinary scrapers which consist of scoops dragged upon the ground when filled, so that power is unnecessarily wasted in advancing the scrapers from point to point. When the place is reached where it is desired to discharge the material, the operator pulls the manipulating lever arm 43 upward, and the scoop, together with the guard, is then swung forward and upward so that the material can be dumped from the scoop, sliding over the rear edge of the same when it is in the position shown in Fig. 4. The forward and upward movement of the scoop when dumping, can be facilitated by having the draft means advance slightly at the same time that the lever arm 43 is pulled upward, for it will be remembered that the draft means are attached through the yoke 28 to the scoop, and in this way the power of the draft means can also be utilized to effect the dumping action.

Having thus described my invention, I claim as new, and desire to secure by Letters Patent:

1. A scraper, comprising a frame having uprights, an axle pivotally carried by said uprights and having offset parts, supporting wheels mounted upon said offset parts, a scoop pivotally mounted upon said axle, a guard pivotally associated with said scoop and controlled by said offset parts of said axle, and means for operating said axle to raise and lower said frame.

2. A scraper, comprising a frame, an axle pivotally carried by said frame and having offset parts, supporting wheels mounted upon said offset parts, a scoop pivotally carried by said axle, a guard pivotally associated with said scoop and adapted to be engaged by said offset parts of said axle, whereby said guard can be inoperatively disposed by a movement of said axle, and means for operating said axle to raise and lower said frame.

3. A scraper, comprising a frame having a back, a pivoted scoop normally resting against said back, means for swinging said scoop, said means serving in a predetermined position, to lock said scoop against said back, and draft means secured to said scoop.

4. A scraper, comprising a frame having a back, a pivoted scoop normally resting against said back, means for swinging said scoop toward and away from said back and serving in a predetermined position, to lock said scoop against said back, draft means secured to said scoop, means for raising and lowering said frame, and a guard pivotally associated with said scoop and adapted to be positioned at the front of the same, said raising and lowering means controlling said guard.

5. A scraper, comprising a frame, an axle pivotally mounted thereon and having offset parts, supporting wheels mounted upon said offset parts, a pivoted lever, connecting means between said lever and said axle, whereby said axle can be operated to raise and lower said frame, a scoop pivotally carried by said frame, means for tilting said scoop, said means being operative in a predetermined position to lock said scoop against movement, and a guard pivotally associated with said scoop and controlled by said axle.

6. A scraper, comprising a frame, an axle pivotally mounted thereon and having offset parts, supporting wheels mounted upon said offset parts, a pivoted lever, connecting means between said lever and said axle, whereby said axle can be operated to raise and lower said frame, a scoop pivotally carried by said frame, means for tilting said scoop, said means being operative in a predetermined position to lock said scoop against movement, a guard pivotally associated with said scoop and controlled by said axle, draft means secured to said scoop, and a back carried by said frame and adapted to have said scoop rest thereagainst when said scoop is locked in position.

7. A scraper, comprising a frame, uprights mounted upon said frame, an axle journaled in said uprights and having offset parts, wheels mounted upon said offset parts, a pivoted lever, means connecting said lever and said offset parts, means for locking said lever in a plurality of positions, a scoop pivotally depending from said axle, a back carried by said frame, means for swinging said scoop, said means, in a predetermined position, serving to lock said scoop against said back, a guard mounted at the front of said scoop and pivotally associated therewith, said guard having stops engaging said offset parts, whereby it is controlled, and draft means secured to said scoop.

8. A scraper, comprising a frame, a back carried thereby, uprights mounted upon said frame, an axle journaled upon said uprights and having offset parts, supporting wheels mounted upon said offset parts, a pivoted lever, a member adapted to coöperate with said lever to lock the same releasably in a plurality of positions, a shaft operatively connected with said lever and having a crank, a connecting rod between said crank and one of said offset parts, a scoop having hangers pivotally carried by said axle, said scoop in a normal position, resting against said back, a pivoted arm, a link connecting said arm and said scoop, whereby the same can be tilted by means of said arm, and a guard operatively secured to said scoop and having stops slidably engaging said offset parts.

9. A scraper, comprising a frame, a back carried thereby, uprights mounted upon said frame, an axle journaled upon said uprights and having offset parts, supporting wheels mounted upon said offset parts, a pivoted lever, a member adapted to coöperate with said lever to lock the same releasably in a plurality of positions, a shaft operatively connected with said lever and having a crank, a connecting rod between said crank and one of said offset parts, a scoop having hangers pivotally carried by said axle, said scoop in a normal position, resting against said back, a pivoted arm, a link connecting said arm and said scoop, whereby the same can be tilted by means of said arm, a guard operatively secured to said scoop and having stops slidably engaging said offset parts, and a yoke pivotally secured to said scoop and serving for the attachment of draft means, said link connecting said arm and said scoop being curved, whereby in a predetermined position of said arm said scoop is held locked against said back.

In testimony whereof I have signed my name to this specification in the presence of two subscribing witnesses.

SAMUEL F. VOSE.

Witnesses:
 FRANK W. BOGGS,
 CHAS. E. WELLS.